(12) United States Patent
Tong

(10) Patent No.: US 8,786,406 B2
(45) Date of Patent: Jul. 22, 2014

(54) INTERACTIVE METHOD AND SYSTEM FOR RECORDING AND PLAYING DATA

(75) Inventor: Jian-Hua Tong, Shalu Township, Taichung County (TW)

(73) Assignee: Hungkuang University, Shalu (TW)

( * ) Notice: Subject to any disclaimer, the term of this patent is extended or adjusted under 35 U.S.C. 154(b) by 633 days.

(21) Appl. No.: 12/952,672

(22) Filed: Nov. 23, 2010

(65) Prior Publication Data

US 2012/0126947 A1 May 24, 2012

(51) Int. Cl.
| | |
|---|---|
| *H04Q 5/22* | (2006.01) |
| *G08B 13/14* | (2006.01) |
| *G06F 17/00* | (2006.01) |
| *H04B 5/00* | (2006.01) |
| *H04B 7/00* | (2006.01) |
| *G11B 20/10* | (2006.01) |
| *G06K 7/01* | (2006.01) |
| *G06K 19/07* | (2006.01) |

(52) U.S. Cl.
CPC ............ *G06K 7/01* (2013.01); *G11B 20/10527* (2013.01); *G06K 19/07* (2013.01); *G09B 8/062* (2013.01)
USPC ...... 340/10.1; 340/572.1; 235/375; 455/41.1; 455/41.2

(58) Field of Classification Search
USPC ........................................................ 340/10.1
See application file for complete search history.

(56) References Cited

U.S. PATENT DOCUMENTS

| | | | |
|---|---|---|---|
| 6,611,673 B1 * | 8/2003 | Smith et al. ................... 455/564 |
| 6,655,586 B1 * | 12/2003 | Back et al. ..................... 235/382 |
| 7,182,261 B2 * | 2/2007 | Chen ......................... 235/462.13 |
| 7,427,018 B2 * | 9/2008 | Berkun ......................... 235/380 |
| 7,525,437 B2 * | 4/2009 | Takeuchi et al. ............ 340/572.1 |
| 7,596,602 B2 * | 9/2009 | Ellman ......................... 709/206 |
| 8,234,677 B2 * | 7/2012 | Fellenstein et al. ............ 725/74 |
| 2003/0024975 A1 * | 2/2003 | Rajasekharan ............... 235/375 |
| 2004/0126038 A1 * | 7/2004 | Aublant et al. ............... 382/305 |
| 2006/0188230 A1 * | 8/2006 | An .................................. 386/95 |
| 2009/0132073 A1 * | 5/2009 | Hsu ................................ 700/94 |
| 2010/0308964 A1 * | 12/2010 | Ackley et al. ............... 340/10.1 |

* cited by examiner

*Primary Examiner* — Jennifer Mehmood
*Assistant Examiner* — John Mortell
(74) *Attorney, Agent, or Firm* — Thomas, Karceski & Karmilovich, PC

(57) ABSTRACT

An interactive method for recording and playing data is implemented using an interactive system including a recording and playing unit, a processing unit, an RFID reader, and a memory. The method includes: a) configuring the processing unit to receive a record/stop request signal; b) configuring the processing unit to determine whether to activate the RFID reader; c) configuring the processing unit to activate the RFID reader for RFID tag reading when the processing unit determines to activate the RFID reader in step b); d) configuring the RFID reader to read a first RFID tag and to send a first identification code to the processing unit; e) configuring the processing unit to control the recording and playing unit to record data so as to generate recorded data; and f) configuring the processing unit to store the recorded data in the memory using the first identification code as an index.

20 Claims, 3 Drawing Sheets

INTERACTIVE METHOD AND SYSTEM FOR RECORDING AND PLAYING DATA

BACKGROUND OF THE INVENTION

1. Field of the Invention

The present invention relates to an interactive method and an interactive system, more particularly to an interactive method and an interactive system for recording and playing data.

2. Description of the Related Art

In recent years, parent-child book reading has become an important way to help a child become a reader. However, in today's busy society, parents have less and less time to get together with and educate their children. Due to limited time, parent-child book reading is often replaced by commercial audio books or videos. Although these materials might benefit a child, dull recordings may reduce a child's interest in learning.

On-site learning is gaining attention and becoming a popular topic for discussion. On-site learning referred to herein refers to bringing a child to a particular location in a home, building, facility, etc., and educating him or her about different aspects of the location. The purpose of on-site learning is to educate a child with respect to the various aspects of the particular place, to act independently, to cooperate with others, to finish a task, etc. Hence, it is important to determine effective ways to implement on-site learning.

SUMMARY OF THE INVENTION

Therefore, the object of the present invention is to provide an interactive method and an interactive system for recording and playing data.

According to the present invention, an interactive method for recording and playing data is implemented using an interactive system including a recording and playing unit, a processing unit, an RFID (radiofrequency identification) reader, and a memory. The interactive method comprises:

a) configuring the processing unit to receive a record/stop request signal;

b) configuring the processing unit to determine whether to activate the RFID reader in response to receipt of the record/stop request signal;

c) configuring the processing unit to activate the RFID reader for RFID tag reading when the processing unit determines to activate the RFID reader in step b);

d) configuring the RFID reader to read an RFID tag and to send an identification code corresponding to the RFID tag to the processing unit;

e) configuring the processing unit to control the recording and playing unit to record data so as to generate recorded data corresponding to the identification code; and f) configuring the processing unit to store the recorded data in the memory using the identification code as an index when the record/stop request signal is again received by the processing unit in a state where the recording and playing unit is recording data.

According to another aspect, an interactive system is used for recording and playing data. The system comprises an RFID reader, a recording and playing unit, a memory, and a processing unit.

The RFID reader is used for RFID tag reading.

The recording and playing unit is used for recording data so as to generate recorded data, and for playing the recorded data.

The memory is used for storing the recorded data.

The processing unit is coupled electrically to the RFID reader, the recording and playing unit, and the memory. The processing unit executes the steps of a) receiving a request signal that is one of a record/stop request signal and a play/stop request signal, b) determining whether to activate the RFID reader in response to receipt of the request signal, c) activating the RFID reader when it is determined to activate the RFID reader in step b), d) receiving an identification code corresponding to an RFID tag read by the RFID reader, and e) controlling the recording and playing unit to record data so as to generate the recorded data which corresponds to the identification code and storing the recorded data in the memory using the identification code as an index when the request signal is the record/stop request signal and the record/stop request signal is again received by the processing unit in a state where the recording and playing unit is recording data, and searching for the recorded data which corresponds to the identification code in the memory and controlling the recording and playing unit to play the recorded data corresponding to the identification code after finding the recorded data corresponding to the identification code when the request signal is the play/top request signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
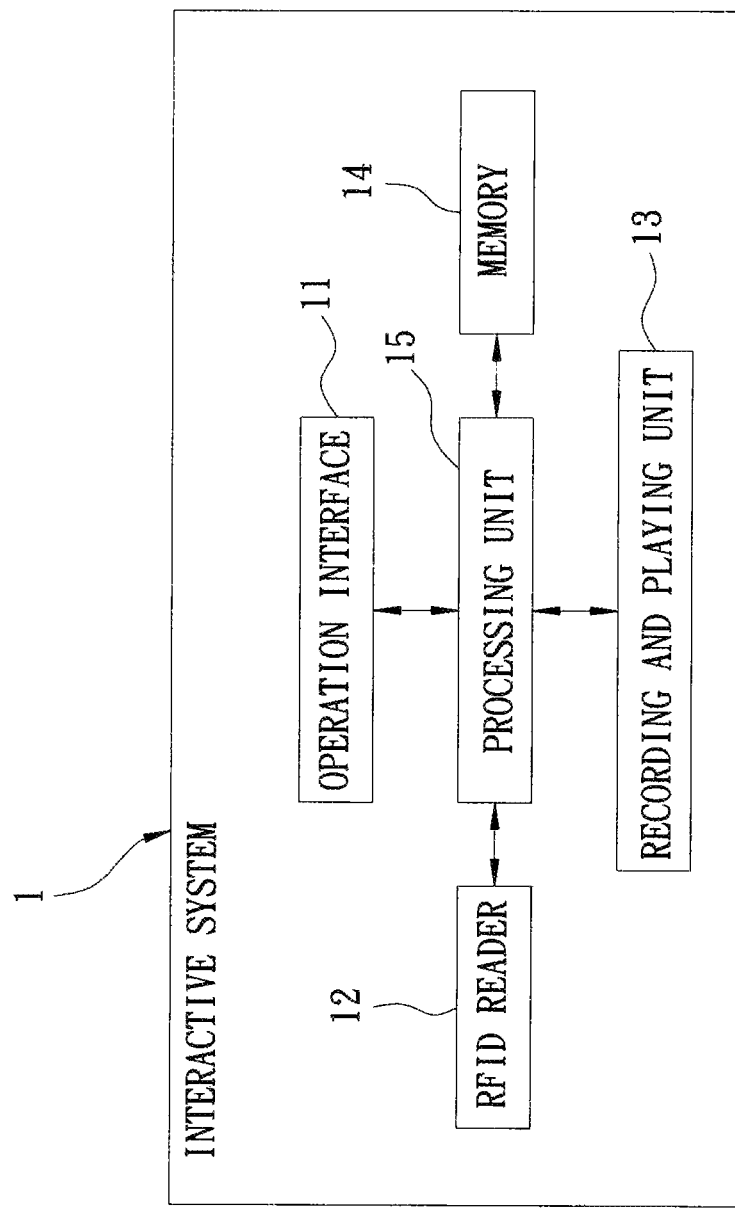
FIG. 1 is a schematic circuit block diagram of an interactive system according to a preferred embodiment of the present invention.

Referring to FIG. 1, a preferred embodiment of an interactive system 1 according to the present invention is used for recording and playing data. The interactive system 1 comprises an operation interface 11, a recording and playing unit 13, a processing unit 15, an RFID (radio frequency identification) reader 12, and a memory 14.

The operation interface 11 is used by a user to operate the interactive system 1 and generate corresponding request signals. The user may be a parent, a teacher, a child, etc. The RFID reader 12 performs RFID tag reading. The recording and playing unit 13 records data so as to generate recorded data, and plays the recorded data. In this embodiment, the recording and playing unit 13 may be realized using an audio and video encoder/decoder chip. The memory 14 stores the recorded data. The processing unit 15 receives the request signals and performs control corresponding to the request signals.

The interactive system 1 can be applied to various fields. For instance, the interactive system 1 can be used in the area of parent-child book reading or in on-site learning. With parent-child book reading, when parents or teachers obtain a new book, an RFID tag can be disposed on the new book.

Hence, different books are provided respectively with different RFID tags. As for on-site learning, different places or equipment, etc. in a particular location are provided with RFID tags, which can be placed by parents or teachers. Next, for example, parents or teachers press a record/stop button (not shown) on the operation interface 11 so that the operation interface 11 subsequently generates a record/stop request signal, requesting the interactive system 1 to implement the recording process of the interactive method. A play/stop button (not shown) on the operation interface 11 may then be pressed by a child, parent, or teacher to play previously recorded data.

Hence, an interactive method according to a preferred embodiment of the present invention includes a recording process and a playing process, which are described below.

Figure 2:
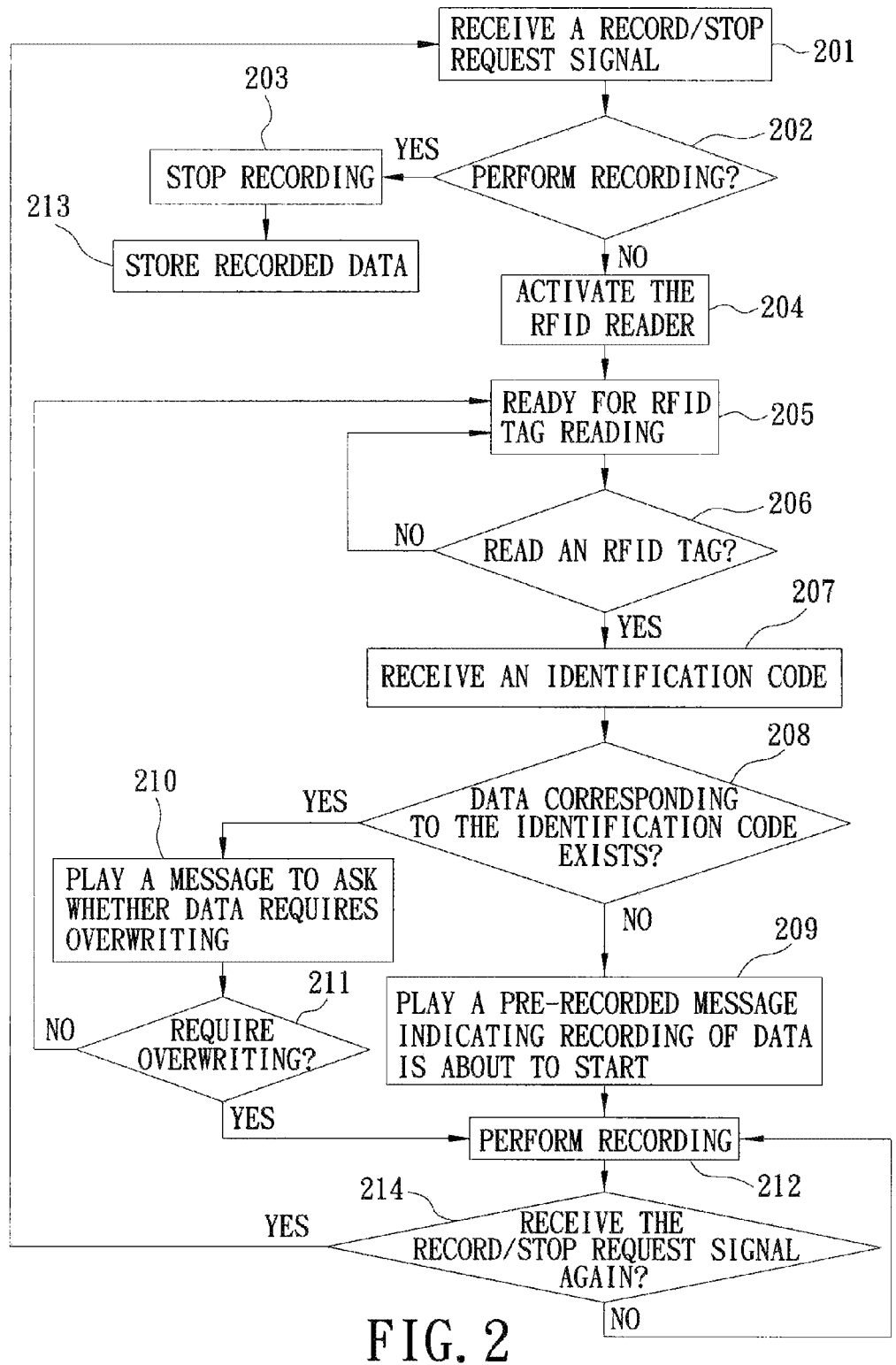
FIG. 2 is a flow chart of an interactive method according to a preferred embodiment of the present invention, illustrating the steps in a recording process.

Referring to FIGS. 1 and 2, the recording process of the interactive method comprises the steps as outlined below.

The processing unit 15 receives a record/stop request signal in step 201. The record/stop request signal is transmitted to the processing unit 15 from the operation interface 11 in response to the user pressing the record/stop button thereon.

Next, the processing unit 15 determines whether the recording and playing unit 13 is performing recording in step 202. In this case, it is assumed that the recording and playing unit 13 was not in the process of performing recording when the user pressed the record/stop button of the operation interface 11. Hence, the processing unit 15 determines that the recording and playing unit 13 is not presently performing recording in step 202, and as a result, the process proceeds to step 204.

In step 204, the processing unit 15 determines to activate the RFID reader 12 for RFID tag reading.

In step 205, the RFID reader 12 is standing by in a state ready for RFID tag reading.

The processing unit 15 checks whether the RFID reader 12 has already read a first RFID tag in step 206.

If the RFID reader 12 has read the first RFID tag, then the RFID reader 12 sends a first identification code corresponding to the first RFID tag to the processing unit 15 in step 207. Otherwise, the process returns to step 205.

In some embodiments, when the RFID reader 12 is in the state standing by ready for RFID tag reading, the processing unit 15 disables the RFID reader 12 if the RFID reader 12 does not read any RFID tag during a predetermined time interval (e.g., 10 seconds). In such embodiments, the process is ended and does not start again until the processing unit 15 receives a new record/stop request signal in step 201.

In step 208, the processing unit 15 checks whether data corresponding to the first identification code is already stored in the memory 14.

If data corresponding to the first identification code is not already stored in the memory 14, then the recording and playing unit 13 plays a pre-recorded message to indicate that recording of data is about to start in step 209. However, if data corresponding to the first identification code is already stored in the memory 14, the process proceeds to step 210.

In step 210, when data corresponding to the first identification code is already stored in the memory 14, the recording and playing unit 13 plays another pre-recorded message to ask whether data corresponding to the first identification code requires overwriting. At this time, the user can operate the operation interface 11 to determine whether to overwrite data, and the operation interface 11 subsequently sends out a corresponding user signal.

In some embodiments, rather than pre-recorded voice messages, text messages may be displayed on a screen (not shown) of the interactive system 1 to indicate that the recording of data is about to start in step 209 and to ask whether data corresponding to the first identification code requires overwriting in step 210. In still other embodiments, warning lights (not shown) of the interactive system 1 may be illuminated to provide such indication to or require such confirmation from the user.

In step 211, if the processing unit 15 receives the user signal indicating that the data corresponding to the first identification code already stored in the memory 14 does not require overwriting, the process is returned to step 205. Otherwise, the process proceeds to step 212. In some embodiments, if the processing unit 15 receives the user signal indicating that the data corresponding to the first identification code already stored in the memory does not require overwriting, the process may be returned to step 201.

In step 212, the processing unit 15 controls the recording and playing unit 13 to record data so as to generate recorded data corresponding to the first identification code. As is evident from the above description, step 212 is performed when data corresponding to the first identification code is not already stored in the memory 14 or is already stored in the memory 14 and the processing unit 15 receives a user signal indicating that the data corresponding to the first identification code already stored in the memory 14 requires overwriting. The recorded data includes voice data and/or video data of parent-child book reading or on-site learning.

Next, the process proceeds to step 214. In step 214, the processing unit 15 checks whether the record/stop request signal is again received. The purpose of step 214 is to determine whether the user desires to stop recording after having completed the same.

If the record/stop request signal is not received again, recording data in step 212 is performed continually. Otherwise, the process proceeds to step 201 of the processing unit 15 receiving the record/stop request signal, after which step 202 is performed. In step 202, in this case, since the recording and playing unit 13 was in the process of performing recording when the user pressed the record/stop button of the operation interface 11, the process proceeds to step 203. In step 203, the processing unit 15 stops operation of the recording and playing unit 13.

In step 213, the processing unit 15 stores the recorded data in the memory 14 using the first identification code as an index. Hence, step 213 is performed when the record/stop request signal is again received by the processing unit 15 in a state where the recording and playing unit 13 is recording data. During this process, the processing unit 15 is configured to first stop operation of the recording and playing unit in step 203 prior to storing the recorded data in the memory 14 in step 213, as described above.

When the user presses the play/stop button on the operation interface 11, the operation interface 11 subsequently generates a play/stop request signal such that the interactive system 1 can carry out the playing process.

Figure 3:
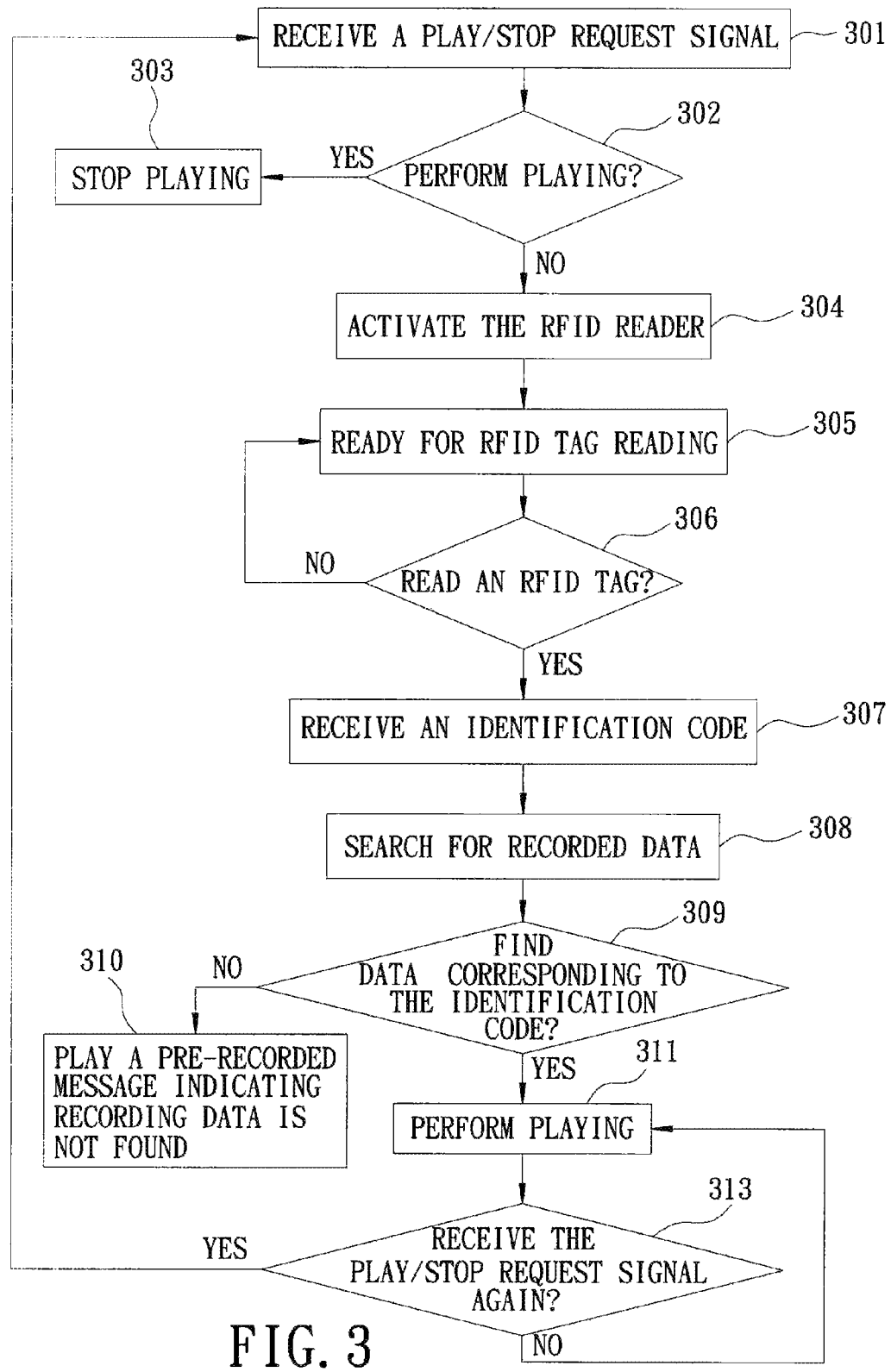
FIG. 3 is a flow chart of the interactive method according to a preferred embodiment of the present invention, illustrating the steps in a playing process.

Referring to FIGS. 1 and 3, the playing process of the interactive method comprises the steps as outlined below.

The processing unit 15 receives the play/stop request signal in step 301.

Next, the processing unit 15 checks whether the recording and playing unit 13 is performing playing in step 302. In this case, it is assumed that the recording and playing unit 13 was not in the process of performing playing when the user pressed the play/stop button of the operation interface 11. Hence, the processing unit 15 determines that the recording and playing unit 13 is not presently performing playing in step 302, and as a result, the process proceeds to step 304.

In step 304, the processing unit 15 determines to activate the RFID reader 12 for RFID tag reading.

In step 305, the RFID reader 12 is standing by in a state ready for RFID tag reading.

The processing unit 15 checks whether the RFID reader 12 has already read a second RFID tag in step 306. It is to be noted that "first" and "second" are used with respect to the RFID tags of the recording process and the playing process, respectively, to avoid confusion. Of course, it is possible that these RFID tags are the same. For example, recording may be performed with respect to a book on which has been attached a certain RFID tag in the recording process, after which playing may be performed with respect to the same book having the same RFID tag in the playing process.

If the RFID reader 12 has read the second RFID tag, then the RFID reader 12 sends a second identification code corresponding to the second RFID tag to the processing unit 15 in step 307. Otherwise, the process returns to step 305.

Similar to the aforesaid recording process, in some embodiments, when the RFID reader 12 is in the state standing by ready for RFID tag reading, the processing unit 15 disables the RFID reader 12 if the RFID reader 12 does not read any RFID tag during a predetermined time interval. In such embodiments, the process is ended and does not start again until the processing unit 15 receives a new play/stop request signal in step 301.

In step 308, the processing unit 15 searches for recorded data corresponding to the second identification code in the memory 14.

In step 309, the processing unit 15 checks whether recorded data corresponding to the second identification code is already stored in the memory 14.

If data corresponding to the second identification code is not already stored in the memory 14, then the recording and playing unit 13 plays a pre-recorded message indicating that recording data is not found in the memory 14 in step 310. Otherwise, the process proceeds to step 311.

As in the case of the recording process, rather than a pre-recorded voice message, such an indication may be provided to the user by way of a display on a screen of the interactive system 1, by way of warning lights of the interactive system, etc.

In step 311, the processing unit 15 controls the recording and playing unit 13 to play the recorded data corresponding to the second identification code after the processing unit 15 finds the recorded data corresponding to the second identification code in the memory 14.

Next, the process proceeds to step 313. In step 313, the processing unit 15 checks whether the play/stop request signal is again received. The purpose of step 213 is to determine whether the user desires to stop the playing process.

If the play/stop request signal is not received again, playing data in step 311 is performed continually. Otherwise, the process proceeds to step 301 of the processing unit 15 receiving the play/stop request signal, after which step 302 is performed. In step 302, in this case, since the recording and playing unit 13 was in the process of performing playing when the user pressed the record/stop button of the operation interface 11, the process proceeds to step 303. In step 303, the processing unit 15 stops operation of the recording and playing unit 13.

In summary, the present invention has many advantages. Firstly, an RFID tag can be disposed on a particular book, article, or location, which increases the overall flexibility for learning. Secondly, recorded data is recorded by parents, teachers, and/or children, rather than by an unknown third party, which increases the interest in learning. Thirdly, because children's hand-to-eye coordination and finger dexterity are not well developed, the use of RFID tag reading enhances convenience for young users.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An interactive method for recording and playing data to be implemented using an interactive system including a recording and playing unit, a processing unit, an RFID (radio frequency identification) reader, and a memory, the interactive method comprising:
   a) receiving by the processing unit a record/stop request signal;
   b) after step a), determining by the processing unit whether to activate the RFID reader in response to receipt of the record/stop request signal;
   c) activating by the processing unit the RFID reader for RFID tag reading when the processing unit determines to activate the RFID reader in step b);
   d) after step c), reading by the RFID reader a first RFID tag and sending a first identification code corresponding to the first RFID tag to the processing unit;
   e) after step d), controlling by the processing unit the recording and playing unit to record data so as to generate recorded data corresponding to the first identification code; and
   f) after step e), storing by the processing unit the recorded data in the memory using the first identification code as an index when the record/stop request signal is again received by the processing unit when the recording and playing unit is recording data.

2. The interactive method as claimed in claim 1, further comprising, in step b), determining by the processing unit to activate the RFID reader when the recording and playing unit is not recording data.

3. The interactive method as claimed in claim 1, further comprising, in step f), by the processing unit first stopping operation of the recording and playing unit prior to storing the recorded data in the memory.

4. The interactive method as claimed in claim 1, further comprising between step c) and step d):
   g) disabling by the processing unit the RFID reader if the RFID reader does not read any RFID tag during a predetermined time interval.

5. The interactive method as claimed in claim 1, wherein step e) includes:
   e-1) controlling by the processing unit the recording and playing unit to record data so as to generate recorded data corresponding to the first identification code when data corresponding to the first identification code is not already stored in the memory.

6. The interactive method as claimed in claim 5, wherein step e) further includes:
   e-2) controlling by the processing unit the recording and playing unit to record data so as to generate recorded data corresponding to the first identification code when data corresponding to the first identification code is already stored in the memory and the processing unit receives a user signal indicating that the data corresponding to the first identification code already stored in the memory requires overwriting.

7. The interactive method as claimed in claim 6, wherein in step e-2), the process is returned to step c) if the processing unit receives the user signal indicating that the data corresponding to the first identification code already stored in the memory does not require overwriting.

8. The interactive method as claimed in claim 6, wherein in step e-2, the process is returned to step a) if the processing unit receives the user signal indicating that the data corresponding to the first identification code already stored in the memory does not require overwriting.

9. The interactive method as claimed in claim 1, further comprising:
  h) receiving by the processing unit a play/stop request signal;
  i) determining by the processing unit whether to activate the RFID reader in response to receipt of the play/stop request signal;
  j) activating by the processing unit the RFID reader for RFID tag reading when the processing unit determines to activate the RFID reader in step i);
  k) reading by the RFID reader a second RFID tag and sending a second identification code corresponding to the second RFID tag to the processing unit;
  l) searching by the processing unit for recorded data corresponding to the second identification code in the memory; and
  m) controlling by the processing unit the recording and playing unit to play the recorded data corresponding to the second identification code after the processing unit finds the recorded data corresponding to the second identification code in the memory.

10. The interactive method as claimed in claim 9, further comprising, in step i), determining by the processing unit to activate the RFID reader when the recording and playing unit is not presently performing playing.

11. The interactive method as claimed in claim 9, further comprising between step j) and step k):
  n) disabling by the processing unit the RFID reader if the RFID reader does not read any RFID tag during a predetermined time interval.

12. The interactive method as claimed in claim 9, further comprising after step m):
  o) controlling by the processing unit the recording and playing unit to stop playing the recorded data when the play/stop request signal is received again in a state where the recording and playing unit is playing the recorded data.

13. An interactive system for recording and playing data, the system comprising:
  an RFID reader for RFID tag reading;
  a recording and playing unit for recording data so as to generate recorded data, and for playing the recorded data;
  a memory for storing the recorded data; and
  a processing unit coupled electrically to the RFID reader, the recording and playing unit, and the memory, the processing unit executing the steps of
  a) receiving a request signal that is one of a record/stop request signal and a play/stop request signal,
  b) after step a), determining whether to activate the RFID reader in response to receipt of the request signal,
  c) activating the RFID reader when it is determined to activate the RFID reader in step b),
  d) after step c), receiving an identification code corresponding to an RFID tag read by the RFID reader, and
  e) after step d), controlling the recording and playing unit to record data, to generate the recorded data which corresponds to the identification code, and to store the recorded data in the memory using the identification code as an index when the request signal is the record/stop request signal and the record/stop request signal is again received by the processing unit when the recording and playing unit is recording data, and controlling the recording and playing unit to search for the recorded data which corresponds to the identification code in the memory and to play the recorded data corresponding to the identification code after finding the recorded data corresponding to the identification code when the request signal is the play/stop request signal.

14. The interactive system as claimed in claim 13, wherein when the request signal is the record/stop request signal in step a), in step b), the processing unit determines to activate the RFID reader when the recording and playing unit is not presently performing recording.

15. The interactive system as claimed in claim 13, wherein when the request signal is the record/stop request signal in step a), in step e), the processing unit first stops operation of the recording and playing unit prior to storing the recorded data in the memory using the first identification code as an index.

16. The interactive system as claimed in claim 13, wherein when the request signal is the play/stop request signal in step a), in step b), the processing unit stops operation of the recording and playing unit if it is determined that the recording and playing unit is presently performing playing.

17. The interactive system as claimed in claim 13, wherein when the request signal is the record/stop request signal in step a), in step e), the processing unit controls the recording and playing unit to record data so as to generate the recorded data which corresponds to the identification code when data corresponding to the identification code is not already stored in the memory.

18. The interactive system as claimed in claim 17, wherein the request signal is the record/stop request signal in step a), in step e), the processing unit controls the recording and playing unit to record data so as to generate the recorded data which corresponds to the identification code when data corresponding to the identification code is already stored in the memory and the processing unit receives a user signal indicating that the data corresponding to the identification code already stored in the memory requires overwriting.

19. The interactive system as claimed in claim 13, wherein the recorded data includes at least one of voice data and video data.

20. The interactive system as claimed in claim 13, wherein when the request signal is the play/stop request signal in step a), in step e), the recording and playing unit is controlled to stop playing the recorded data when the play/stop request signal is again received by the processing unit when the recording and playing unit is playing the recorded data.

* * * * *